US009218107B1

United States Patent
Eilam (10) Patent No.: US 9,218,107 B1
(45) Date of Patent: *Dec. 22, 2015

(54) CLOUD-BASED TEXT MANAGEMENT FOR CROSS-PLATFORM DISPLAY

(75) Inventor: Eldad Eilam, San Jose, CA (US)

(73) Assignee: HOPTO INC., Campbell, CA (US)

( * ) Notice: Subject to any disclaimer, the term of this patent is extended or adjusted under 35 U.S.C. 154(b) by 344 days.

This patent is subject to a terminal disclaimer.

(21) Appl. No.: 13/341,750

(22) Filed: Dec. 30, 2011

(51) Int. Cl.
*H04L 29/06* (2006.01)
*G06F 3/0484* (2013.01)

(52) U.S. Cl.
CPC .............. *G06F 3/0484* (2013.01); *H04L 67/42* (2013.01)

(58) Field of Classification Search
CPC .............. G06F 3/0484; G06F 3/04842; G06F 3/04845; G06F 17/3028; H04L 67/42; H04L 51/14; H04L 67/16; H04L 41/22; H04N 7/106; H04N 21/4781; H04N 21/6125
See application file for complete search history.

(56) References Cited

U.S. PATENT DOCUMENTS

| | | | |
|---|---|---|---|
| 5,745,115 A | 4/1998 | Purple et al. |
| 5,831,609 A | 11/1998 | London et al. |
| 6,421,070 B1 | 7/2002 | Ramos et al. |
| 6,636,242 B2 | 10/2003 | Bowman-Amuah |
| 6,710,786 B1 | 3/2004 | Jacobs et al. |
| 6,758,394 B2 | 7/2004 | Maskatiya et al. |
| 7,039,875 B2 | 5/2006 | Khalfay et al. |
| 7,185,069 B2 | 2/2007 | Costin et al. |
| 7,210,099 B2 | 4/2007 | Rohrabaugh et al. |
| 7,325,027 B2 | 1/2008 | Grown |
| 7,418,472 B2 | 8/2008 | Shoemaker et al. |
| 7,472,157 B2 | 12/2008 | Tolson et al. |
| 7,631,328 B2 | 12/2009 | Clancy et al. |
| 7,667,704 B2 | 2/2010 | Hogle |
| 7,844,889 B2 | 11/2010 | Rohrabaugh et al. |
| 7,877,703 B1 | 1/2011 | Fleming |
| 8,073,954 B1 | 12/2011 | Tu et al. |
| 8,108,830 B2 | 1/2012 | Bibr et al. |
| 8,583,627 B1 | 11/2013 | Kamvar et al. |
| 8,763,054 B1 | 6/2014 | Eilam |

(Continued)

FOREIGN PATENT DOCUMENTS

| WO | WO 00/30729 | 6/2000 |
|---|---|---|
| WO | WO 2004/059938 | 7/2004 |

OTHER PUBLICATIONS

Andujar, C.; Fairen, M.; Argelaguet, F., "A Cost-effective Approach for Developing Application-control GUIs for Virtual Environments," 3D User Interfaces, 2006. 3DUI 2006. IEEE Symposium on, vol., no., pp. 45,52, Mar. 25-29, 2006, doi:10.1109/VR.2006.6.

(Continued)

*Primary Examiner* — Maurice L McDowell, Jr.
*Assistant Examiner* — Raffi Isanians
(74) *Attorney, Agent, or Firm* — Lewis Roca Rothgerber LLP (57) ABSTRACT

Data including information regarding a display of the host device may be received. Such information may be used to identify one or more top-level windows in the host device display. Further, it is determined which of the top-level windows is currently active. The active top-level window may be determined to include a text caret and further, that the text caret is active such a keyboard display appears in a portion of the display of the client device. Instructions are generated for automatic adjustment of the remaining portion of the display of the client device based on the location of the text caret.

17 Claims, 4 Drawing Sheets

(56) References Cited

U.S. PATENT DOCUMENTS

| | | | |
|---|---|---|---|
| 8,763,055 B1 | 6/2014 | Eilam | |
| 8,775,545 B1 | 7/2014 | Eilam | |
| 8,776,152 B1 | 7/2014 | Eilam | |
| 8,856,262 B1 | 10/2014 | Eilam | |
| 8,990,363 B1 | 3/2015 | Currey | |
| 9,106,612 B1 | 8/2015 | Currey | |
| 9,124,562 B1 | 9/2015 | Currey | |
| 2002/0103906 A1 | 8/2002 | Knight et al. | |
| 2002/0196378 A1 | 12/2002 | Slobodin et al. | |
| 2003/0053091 A1 | 3/2003 | Tanaka et al. | |
| 2003/0058286 A1 | 3/2003 | Dando | |
| 2003/0069923 A1 | 4/2003 | Peart | |
| 2003/0182628 A1 | 9/2003 | Lira | |
| 2003/0208529 A1 | 11/2003 | Pendyala et al. | |
| 2004/0017155 A1 | 1/2004 | Enokida et al. | |
| 2004/0024899 A1 | 2/2004 | Sturrock et al. | |
| 2004/0205715 A1 | 10/2004 | Taylor | |
| 2004/0267813 A1 | 12/2004 | Rivers-Moore et al. | |
| 2005/0080915 A1 | 4/2005 | Shoemaker et al. | |
| 2005/0198100 A1 | 9/2005 | Goring et al. | |
| 2005/0235214 A1 | 10/2005 | Shimizu et al. | |
| 2005/0240873 A1 | 10/2005 | Czerwinski et al. | |
| 2006/0002315 A1 | 1/2006 | Theurer et al. | |
| 2006/0020904 A1 | 1/2006 | Aaltonen et al. | |
| 2006/0055701 A1 | 3/2006 | Taylor et al. | |
| 2006/0082581 A1 | 4/2006 | Schmieder et al. | |
| 2006/0082582 A1 | 4/2006 | Schmieder et al. | |
| 2006/0082583 A1 | 4/2006 | Leichtling et al. | |
| 2006/0085550 A1 | 4/2006 | Schmieder et al. | |
| 2006/0087512 A1 | 4/2006 | Schmieder et al. | |
| 2006/0149810 A1 | 7/2006 | Koo et al. | |
| 2006/0184982 A1 | 8/2006 | Paz et al. | |
| 2006/0195523 A1 | 8/2006 | Juang et al. | |
| 2006/0225037 A1 | 10/2006 | Glein et al. | |
| 2006/0227141 A1 | 10/2006 | Hogle | |
| 2006/0274302 A1 | 12/2006 | Shylanski et al. | |
| 2007/0005693 A1 | 1/2007 | Sampath et al. | |
| 2007/0016651 A1 | 1/2007 | Blagsvedt et al. | |
| 2007/0124536 A1 | 5/2007 | Carper | |
| 2007/0153319 A1 | 7/2007 | Moon et al. | |
| 2007/0162854 A1 | 7/2007 | Kikinis | |
| 2007/0220419 A1 | 9/2007 | Stibel et al. | |
| 2007/0229524 A1 | 10/2007 | Hendrey et al. | |
| 2008/0009344 A1 | 1/2008 | Graham et al. | |
| 2008/0016155 A1 | 1/2008 | Khalatian | |
| 2008/0034320 A1 | 2/2008 | Ben-Shachar et al. | |
| 2008/0082604 A1 | 4/2008 | Mansour et al. | |
| 2008/0098291 A1 | 4/2008 | Bradley et al. | |
| 2008/0307047 A1 | 12/2008 | Jowett et al. | |
| 2008/0320396 A1 | 12/2008 | Mizrachi et al. | |
| 2009/0044103 A1 | 2/2009 | Chalecki et al. | |
| 2009/0100483 A1 | 4/2009 | McDowell | |
| 2009/0125838 A1 | 5/2009 | Bhogal et al. | |
| 2009/0157657 A1 | 6/2009 | Kim et al. | |
| 2009/0228779 A1 | 9/2009 | Williamson et al. | |
| 2009/0271501 A1 | 10/2009 | Shenfield et al. | |
| 2009/0292999 A1 | 11/2009 | LaBine et al. | |
| 2009/0320073 A1 | 12/2009 | Reisman | |
| 2010/0005396 A1 | 1/2010 | Nason et al. | |
| 2010/0111410 A1 | 5/2010 | Lu et al. | |
| 2010/0118039 A1 | 5/2010 | Labour | |
| 2010/0138809 A1 | 6/2010 | Shenfield et al. | |
| 2010/0162126 A1 | 6/2010 | Donaldson et al. | |
| 2010/0174974 A1 | 7/2010 | Brisebois et al. | |
| 2010/0279678 A1 | 11/2010 | Li et al. | |
| 2010/0281402 A1 | 11/2010 | Staikos et al. | |
| 2011/0032328 A1 | 2/2011 | Raveendran et al. | |
| 2011/0040826 A1 | 2/2011 | Chadzelek et al. | |
| 2011/0041092 A1 | 2/2011 | Zhang | |
| 2011/0078532 A1 | 3/2011 | Vonog et al. | |
| 2011/0078621 A1 | 3/2011 | Kanda | |
| 2011/0085016 A1 | 4/2011 | Kristiansen et al. | |
| 2011/0099494 A1 | 4/2011 | Yan et al. | |
| 2011/0113089 A1 | 5/2011 | Priyadarshan et al. | |
| 2011/0213855 A1 | 9/2011 | King | |
| 2011/0219331 A1 | 9/2011 | DeLuca et al. | |
| 2011/0231782 A1 | 9/2011 | Rohrabaugh et al. | |
| 2011/0239142 A1 | 9/2011 | Steeves et al. | |
| 2011/0252299 A1 | 10/2011 | Lloyd et al. | |
| 2011/0283304 A1 | 11/2011 | Roberts et al. | |
| 2011/0299785 A1 | 12/2011 | Albu et al. | |
| 2012/0005691 A1 | 1/2012 | Wong et al. | |
| 2012/0042275 A1 | 2/2012 | Neerudu et al. | |
| 2012/0062576 A1 | 3/2012 | Rosenthal et al. | |
| 2012/0075346 A1 | 3/2012 | Malladi et al. | |
| 2012/0079043 A1 | 3/2012 | Brown et al. | |
| 2012/0084456 A1 | 4/2012 | Vonog et al. | |
| 2012/0093231 A1 | 4/2012 | Nozawa | |
| 2012/0102549 A1* | 4/2012 | Mazzaferri et al. | 726/4 |
| 2012/0114233 A1 | 5/2012 | Gunatilake | |
| 2012/0117145 A1 | 5/2012 | Clift et al. | |
| 2012/0124497 A1 | 5/2012 | Kasoju et al. | |
| 2012/0166967 A1 | 6/2012 | Deimbacher et al. | |
| 2012/0169610 A1 | 7/2012 | Berkes et al. | |
| 2012/0192078 A1 | 7/2012 | Bai et al. | |
| 2012/0214552 A1 | 8/2012 | Sirpal et al. | |
| 2012/0223884 A1 | 9/2012 | Bi et al. | |
| 2012/0254453 A1 | 10/2012 | Lejeune et al. | |
| 2012/0266068 A1 | 10/2012 | Ryman et al. | |
| 2012/0266079 A1* | 10/2012 | Lee et al. | 715/744 |
| 2012/0299968 A1 | 11/2012 | Wong et al. | |
| 2012/0317295 A1 | 12/2012 | Baird et al. | |
| 2013/0019263 A1 | 1/2013 | Ferren et al. | |
| 2013/0055102 A1 | 2/2013 | Matthews et al. | |
| 2013/0124609 A1 | 5/2013 | Martinez et al. | |
| 2013/0194374 A1 | 8/2013 | Kieft et al. | |
| 2013/0215129 A1 | 8/2013 | Keslin | |
| 2013/0229548 A1 | 9/2013 | Masuko | |
| 2014/0082511 A1 | 3/2014 | Weissberg et al. | |
| 2014/0223314 A1 | 8/2014 | Pinto et al. | |

OTHER PUBLICATIONS

Borchers, J.; Ringel, M.; Tyler, J.; Fox, A., "Stanford interactive workspaces: a framework for physical and graphical user interface prototyping," Wireless Communications, IEEE, vol. 9, No. 6, pp. 64,69, Dec. 2002. doi: 10-1109/MWC.2002.1160083.

Boyaci, O.; Schulzrinne, Henning, "BASS Application Sharing System," Multimedia, 2008. ISM 2008. Tenth IEEE International Symposium on, vol., no., pp. 432,439, Dec. 15-17, 2008. doi:10.1109/ISM.2008.97.

Davidyuk, O., Georgantas, N., Issarny, V. & Riekki, J. (2009). MEDUSA: Middleware for End-User Composition of Ubiquitous Applications, In: Mastrogiovanni, F. & Chong, N.Y.(Eds.), Handbook of Research on Ambient Intelligence and Smart Environments: Trends and Perspectives. IGI Global, to appear. Retrieved from: http://www.mediateam.oulu.fi/public.

Fabio Paterno, Carmen Santoro, and Antonio Scorcia. 2008. Automatically adapting websites for mobile access through logical descriptions and dynamic analysis of interaction resources. In Proceedings of the working conference on Advanced visual interfaces (AVI '08). ACM, New York, NY, USA, 260-267. DOI=10.1145/1385569.1385611 http://doi.acm.org/10.

Giullo Mori, Fabio Paterno, and Carmen Santoro. 2003. Tool support for designing nomadic applications. In Proceedings of the 8th international conference on Intelligent user interfaces. (IUI '03). ACM, New York, NY, USA, 141-148. DOI=10.1145/604045.604069 http://doi.acm.org/10.1145/604045.604069.

Giullo Mori, Fabio Paterno, and Carmen Santoro, "Design and development of multidevice user interfaces through multiple logical descriptions," IEEE Transactions on Software Engineering, vol. 30, No. 8, pp. 507-520, Aug. 2004. doi:10-1109/TSE.2004.40.

Huifeng Shen; Yan Lu; Feng Wu; Shipeng Li, "A high-performance remote computing platform," Pervasive Computing and Communications, 2009. PerCom 2009. IEEE International Conference on, vol., no., pp. 1,6, Mar. 9-13, 2009. doi:10.1109/PERCOM.2009.4912855.

Murielle Florins and Jean Vanderdonckt. 2004. Graceful degradation of user interfaces as a design method for multiplatform systems. In Proceedings of the 9th international conference on Intelligent user interfaces (IUI '04). ACM, New York, NY, USA, 140-147. DOI=10.1145/964442.964469 http://doi.acm.org/10.1145/964442.964469.

(56) References Cited

OTHER PUBLICATIONS

Nathalie Aquino, Jean Vanderonckt, and Oscar Pastor. 2010. Transformation templates: adding flexibility to model-driven engineering of user interfaces. In Proceedings of the 2010 ACM Symposium on Applied Computing (SAC '10). ACM, New York, NY, USA, 1195-1202. DOI=10.1145/1774088.1774340 http://doi.acm.org/10-1145/1774088.1774340.
Oleg Davidyuk, Ivan Sanchez, Jon Imanol Duran, and Jukka Riekki. 2008. Autonomic composition of ubiquitous multimedia applications in REACHES. In Proceedings of the 7th International Conference on Mobile and Ubiquitous Multimedia (MUM '08). ACM, New York, NY, USA. 105-108. DOI=10.1145/1543137.1543159 http://doi.acm.org/10.1145/1543137.1543159.
Xu Hu; Congfeng Jiang; Wei Zhang; Jilin Zhang; Ritai Yu; Changping Lv, "An Even Based GUI Programming Toolkit for Embedded System," Services Computing Conference (APSCC), 2010 IEEE Asia-Pacific, vol., no., pp. 625,631, Dec. 6-10, 2010. doi: 10-1109/APSCC.2010.115.
U.S. Appl. No. 13/341,207 Office Action mailed Nov. 18, 2013.
U.S. Appl. No. 13/341,754, Office Action dated Jan. 8, 2014.
U.S. Appl. No. 13/341,227 Office Action mailed Oct. 23, 2013.
U.S. Appl. No. 13/341,756 Office Action mailed Aug. 13, 2013.
U.S. Appl. No. 13/341,238 Final Office Action dated Sep. 17, 2013.
U.S. Appl. No. 13/341,760 Office Action dated Nov. 20, 2013.
U.S. Appl. No. 13/490,329 Office Action mailed Jan. 15, 2014.
U.S. Appl. No. 13/490,330 Office Action mailed Dec. 17, 2013.
U.S. Appl. No. 13/475,916 Office Action dated Nov. 13, 2013.
U.S. Appl. No. 13/475,917 Office Action dated Nov. 18, 2013.
U.S. Appl. No. 13/668,091 Final Office Action dated Nov. 6, 2013.
U.S. Appl. No. 13/670,163 Office Action dated Nov. 6, 2013.
U.S. Appl. No. 13/668,095 Office Action dated Nov. 5, 2013.
U.S. Appl. No. 13/831,782 Office Action dated Nov. 6, 2013.
U.S. Appl. No. 13/831,783 Final Office Action dated Dec. 17, 2013.
U.S. Appl. No. 13/831,783 Office Action dated Sep. 3, 2013.
U.S. Appl. No. 13/831,783 Office Action dated Sep. 4, 2013.
US 8,689,268, 4/2014, Eilam (withdrawn).
U.S. Appl. No. 13/341,222, Office Action mailed Jan. 27, 2014.
U.S. Appl. No. 13/341,756 Final Office Action mailed Feb. 4, 2014.
U.S. Appl. No. 13/341,232 Office Action mailed Mar. 10, 2014.
U.S. Appl. No. 13/341,425 Office Action mailed Mar. 5, 2014.
U.S. Appl. No. 13/341,765 Office Action mailed Feb. 7, 2014.
U.S. Appl. No. 13/490,327 Office Action mailed Jan. 28, 2014.
U.S. Appl. No. 13/475,916 Final Office Action mailed Mar. 12, 2014.
U.S. Appl. No. 13/475,917 Final Office Action mailed Mar. 12, 2014.
U.S. Appl. No. 13/831,782 Final Office Action mailed Feb. 24, 2014.
U.S. Appl. No. 13/341,754, Office Action dated Jul. 31, 2013.
U.S. Appl. No. 13/341,238 Office Action dated Apr. 22, 2013.
U.S. Appl. No. 13/341,760 Office Action dated May 15, 2013.
U.S. Appl. No. 13/668,091 Office Action dated Apr. 23, 2013.
U.S. Appl. No. 13/670,163 Office Action dated May 7, 2013.
U.S. Appl. No. 13/668,095 Office Action dated Apr. 23, 2013.
U.S. Appl. No. 13/341,432 Office Action mailed Mar. 24, 2014.
U.S. Appl. No. 13/341,215 Office Action mailed Mar. 21, 2014.
U.S. Appl. No. 13/341,754, Office Action mailed Apr. 16, 2014.
U.S. Appl. No. 13/341,227 Final Office Action mailed Apr. 18, 2014.
U.S. Appl. No. 13/475,918 Office Action mailed Mar. 12, 2014.
Ali, Mir Farooq, et al., "Building multi-platform user interfaces with UIML." Computer-Aided Design of User Interfaces III. Springer Netherlands, 2002. 255-266.
Cuergo, "Ergonomic Guidelines for arranging a Computer Workstation—steps for users", Jun. 6, 2004. p. 1-5.
Holzinger, Andreas, Peter Treitler, and Wolfgang Slany. "Making apps useable on multiple different mobile platforms: On interoperability for business application development on smartphones." Multidisciplinary Research and Practice for Information Systems. Springer Berlin Heidelberg, 2012. 176-189.
Karch, Marziah, "Android in a Microsoft World." Android for Work. Apress, 2010. 93-102.
U.S. Appl. No. 13/341,207 Final Office Action mailed May 14, 2014.
U.S. Appl. No. 13/341,222, Final Office Action mailed May 15, 2014.
U.S. Appl. No. 13/341,756 Office Action mailed Jun. 11, 2014.
U.S. Appl. No. 13/341,232 Final Office Action mailed Jun. 18, 2014.
U.S. Appl. No. 13/341,765 Final Office Action mailed Jun. 24, 2014.
U.S. Appl. No. 13/490,330 Final Office Action mailed Jul. 17, 2014.
U.S. Appl. No. 13/475,911 Office Action mailed Jun. 24, 2014.
U.S. Appl. No. 13/475,912 Office Action mailed Jun. 24, 2014.
U.S. Appl. No. 13/475,913 Office Action mailed Jun. 24, 2014.
U.S. Appl. No. 13/831,782 Office Action mailed Jul. 17, 2014.
U.S. Appl. No. 13/341,425 Final Office Action mailed Aug. 29, 2014.
U.S. Appl. No. 13/490,327 Final Office Action mailed Aug. 21, 2014.
U.S. Appl. No. 13/490,329 Final Office Action mailed Aug. 11, 2014.
U.S. Appl. No. 13/475,918 Final Office Action mailed Sep. 30, 2014.
U.S. Appl. No. 13/831,783 Office Action mailed Sep. 19, 2014.
U.S. Appl. No. 13/831,786 Office Action mailed Sep. 16, 2014.
U.S. Appl. No. 13/831,786 Final Office Action mailed Dec. 17, 2013.
U.S. Appl. No. 13/831,786 Office Action mailed Sep. 4, 2013.
U.S. Appl. No. 13/341,215 Office Action mailed Apr. 17, 2015.
U.S. Appl. No. 14/337,659 Office Action mailed Mar. 31, 2015.
U.S. Appl. No. 13/341,425 Office Action mailed Apr. 10, 2015.
U.S. Appl. No. 13/490,327 Office Action mailed Apr. 13, 2015.
U.S. Appl. No. 13/490,329 Office Action mailed Apr. 3, 2015.
U.S. Appl. No. 13/831,786 Final Office Action mailed Apr. 9, 2015.
U.S. Appl. No. 13/341,432 Final Office Action mailed Nov. 19, 2014.
U.S. Appl. No. 13/341,215 Final Office Action mailed Dec. 12, 2014.
U.S. Appl. No. 13/341,227 Office Action mailed Dec. 29, 2014.
U.S. Appl. No. 13/341,756 Final Office Action mailed Oct. 22, 2014.
U.S. Appl. No. 13/341,207 Office Action mailed Jan. 27, 2015.
U.S. Appl. No. 13/341,222, Office Action mailed Jan. 29, 2015.
U.S. Appl. No. 13/341,754, Final Office Action mailed Jan. 9, 2015.
U.S. Appl. No. 13/341,232 Office Action mailed Feb. 6, 2015.
U.S. Appl. No. 13/341,765 Office Action mailed Mar. 16, 2015.
U.S. Appl. No. 13/490,330 Office Action mailed Mar. 11, 2015.
U.S. Appl. No. 13/475,911 Final Office Action mailed Mar. 10, 2015.
U.S. Appl. No. 13/475,912 Final Office Action mailed Mar. 10, 2015.
U.S. Appl. No. 13/475,913 Final Office Action mailed Jun. 24, 2014.
U.S. Appl. No. 13/831,782 Final Office Action mailed Feb. 13, 2015.
U.S. Appl. No. 13/341,432 Office Action mailed Mar. 27, 2015.
U.S. Appl. No. 13/341,754, Final Office Action mailed Jan. 13, 2015.
U.S. Appl. No. 13/341,756 Office Action mailed Mar. 27, 2015.
U.S. Appl. No. 13/475,913 Final Office Action mailed Mar. 10, 2015.
U.S. Appl. No. 14/312,925 Office Action mailed Mar. 25, 2015.
U.S. Appl. No. 13/341,222, Office Action mailed Jun. 26, 2015.
U.S. Appl. No. 13/341,207 Final Office Action mailed Jul. 28, 2015.
U.S. Appl. No. 13/341,754, Office Action mailed Aug. 9, 2015.
U.S. Appl. No. 13/341,227 Final Office Action mailed Aug. 13, 2015.
U.S. Appl. No. 13/475,911 Office Action mailed Oct. 22, 2015.
U.S. Appl. No. 14/312,925 Final Office Action mailed Oct. 29, 2015.

* cited by examiner

CLOUD-BASED TEXT MANAGEMENT FOR CROSS-PLATFORM DISPLAY

BACKGROUND

1. Field of the Invention

The present invention generally relates to cross-platform display. More specifically, the present invention relates to managing text for cross-platform display.

2. Description of the Related Art

Individuals currently have a variety of options for communicating and carrying out transactions. Such options may include traditional desktop coming devices, as well as various mobile devices (e.g., mobile phones, smartphones, tablets). In fact, many individuals may use multiple computing and mobile devices at home, work, and on the move. For example, an individual may use a desktop computer at work, a laptop computer at home, and one or more mobile devices (e.g., smartphone, tablet) elsewhere. As such, people have come to expect to be able to have access to data and computing resources so to perform most computing tasks anywhere.

One difficulty in meeting such an expectation is that the various computing devices may not all have the same capabilities. For example, such devices may run different operating systems/platforms and applications. Such differences may make it difficult to support the same tasks across such devices. One solution has been to provide remote desktops where a first device runs the applications and a second device receives the visual display that appears on the first device over a communication network (e.g., Internet). Such remote desktops can allow users to access and control resources and data on the first device at a remote location using a second (e.g., portable) device.

One drawback to such an approach arises from the fact that such devices are generally used differently, so applications may be optimized for one type of device, but not another. For example, the different devices may have different sizes and input options (e.g., keyboard, keypad, touchscreen). The display of one device may not be optimized for a second device. For example, if a desktop computer display is shrunk to fit on a smartphone screen, the shrunken size may be difficult for the user to read or discern what is being displayed. Alternatively, if the display is not shrunken, the smartphone may only be able to display a portion of the original display at a time, which also adds to the difficulty in reading and discerning what is being displayed. While some devices allow for manual adjustment of the display by the user, changing displays and images may require the user to continually re-adjust the display, which may be unwieldy and inconvenient. This difficulty is further heightened where the device lacks a tactile keyboard and instead relies on a keyboard display on a touchscreen. The size of the screen portion for display is further constrained when a keyboard is activated.

There is, therefore, a need in the art for improved systems and methods for managing text for cross-platform display.

SUMMARY OF THE CLAIMED INVENTION

Embodiments of the present invention include systems and methods for managing text for cross-platform display. Data including information regarding a display of the host device may be received. Such information may be used to identify one or more top-level windows in the host device display. Further, it is determined which of the top-level windows is currently active. The active top-level window may be determined to include a text caret and further, that the text caret is active such a keyboard display appears in a portion of the display of the client device. Instructions are generated for automatic adjustment of the remaining portion of the display of the client device based on the location of the text caret.

Various embodiments of the present invention include methods for managing text for cross-platform display. Such methods may include receiving data including information regarding a display of a host device, identifying one or more top-level windows in the host device display, identifying which of the top-level windows is currently active, determining that the active top-level window includes a text caret and that the text caret is active such a keyboard display appears in a portion of the client device display, and generating instructions for automatic adjustment of the remaining portion of the client device display based on the location of the active text caret in the active top-level window.

Embodiments of the present invention may further include systems for managing text for cross-platform display. Such systems may include a host device and a client device requesting information from a host device. The host device may send data responsive to the request, which includes information regarding a display of the host device. The client device may use such information to identify one or more top-level windows, identify which one is active, determine the bounds of the active top-level window, and generate instructions for automatically adjusting the display of the client device based on the bounds of the active top-level window. In some embodiments, an intermediate device (e.g., server) may generate and send the instructions to the client device.

Other embodiments of the present invention include non-transitory computer-readable storage media on which is embodied instructions executable to perform a method of managing text for cross-platform display as previously set forth above.

DETAILED DESCRIPTION

Managing text for cross-platform display is provided. Data including information regarding a display of the host device may be received. Such information may be used to identify one or more top-level windows in the host device display. Further, it is determined which of the top-level windows is currently active. The active top-level window may be determined to include a text caret and further, that the text caret is active such a keyboard display appears in a portion of the display of the client device. Instructions are generated for automatic adjustment of the remaining portion of the display of the client device based on the location of the text caret.

Figure 1:
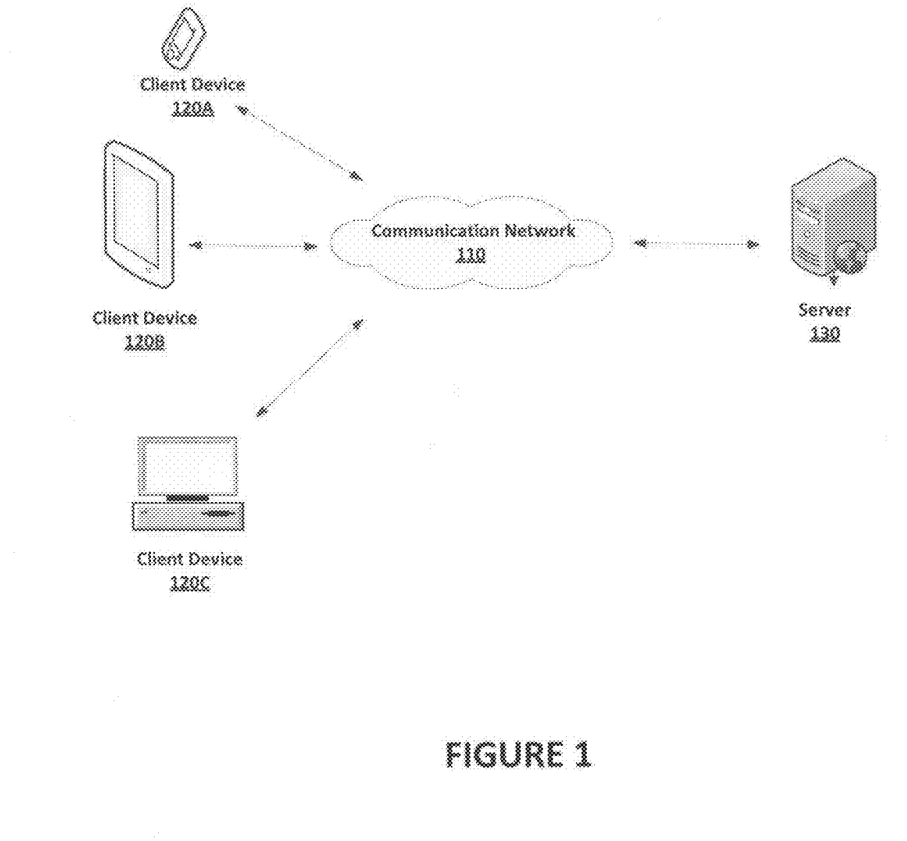
FIG. 1 illustrates a network environment in which an exemplary system of managing text for cross-platform display may be implemented.

FIG. 1 illustrates a network environment 100 in which a system of managing text for cross-platform display may be implemented. Network environment 100 may include a communication network 110, one or more user devices 120A-C, and a server 130. Devices in network environment 100 may communicate with each other via communications network 110.

Communication network 110 may be a local, proprietary network (e.g., an intranet) and/or may be a part of a larger wide-area network (e.g., the cloud). The communications network 110 may be a local area network (LAN), which may be communicatively coupled to a wide area network (WAN) such as the Internet. The Internet is a broad network of interconnected computers and servers allowing for the transmission and exchange of Internet Protocol (IP) data between users connected through a network service provider. Examples of network service providers are the public switched telephone network, a cable service provider, a provider of digital subscriber line (DSL) services, or a satellite service provider. Communications network 110 allows for communication between the various components of network environment 100.

Users may use any number of different electronic client devices 120A-C, such as general purpose computers, mobile phones, smartphones, personal digital assistants (PDAs), portable computing devices (e.g., laptop, netbook, tablets), desktop computing devices, handheld computing device, or any other type of computing device capable of communicating over communication network 110. Client devices 120 may also be configured to access data from other storage media, such as memory cards or disk drives as may be appropriate in the case of downloaded services. Client device 120 may include standard hardware computing components such as network and media interfaces, non-transitory computer-readable storage (memory), and processors for executing instructions that may be stored in memory.

Client device 120A is illustrated as a mobile phone or smartphone, while client device 120B is illustrated as a tablet computing device and client device 120C is illustrated as a desktop device. As can be seen, each client device 120 is sized differently and/or has different input options. Exemplary embodiments of the present invention allow for tasks and applications that are specific to one client device 120 (e.g., operating in a Microsoft Windows® environment) to be used and optimized for another client device 120 (e.g., operating in an Apple iOS® environment).

A client device 120 may include a client application, a client 3D library, and a client display driver. Collectively, these elements may enable the client and the client user to consume computer graphics resources or services provided by server 110.

Server 130 may include any type of server or other computing device as is known in the art, including standard hardware computing components such as network and media interfaces, non-transitory computer-readable storage (memory), and processors for executing instructions or accessing information that may be stored in memory. The functionalities of multiple servers may be integrated into a single server. Any of the aforementioned servers (or an integrated server) may take on certain client-side, cache, or proxy server characteristics. These characteristics may depend on the particular network placement of the server or certain configurations of the server.

Server 130 may associated with the same user and located in the same local network as client device 120C. Alternatively, server 130 may be located remotely (e.g., in the cloud) and may be associated with a third party that provides services in accordance with embodiments of the present invention. In some instances, the services may be provided via software (e.g., software as a service) downloaded from server 130 to one or more client devices 120. Updated software may similarly be downloaded as the updates become available or as needed.

Server application may represent an application executing ("running") on server 130. The functionality of server application may be visible to and accessible by client 120 via application publishing over the cloud (e.g., communication network 110), such as that supported by GraphOn GO-Global, Microsoft Remote Desktop Services, and Citrix XenApp. Examples of server application 132 may include a computer-aided design (CAD) application, such as AutoCAD® (by Autodesk, Inc. of San Rafael, Calif.) or Cadence Virtuoso (by Cadence Design Systems of San Jose, Calif.), a medical clinical workflow application such as Symbia.net (by Siemens AG of Munich, Germany), an interactive mapping application such as Google Earth (by Google, Inc of Mountain View, Calif.), or a 3D game.

Figure 2:
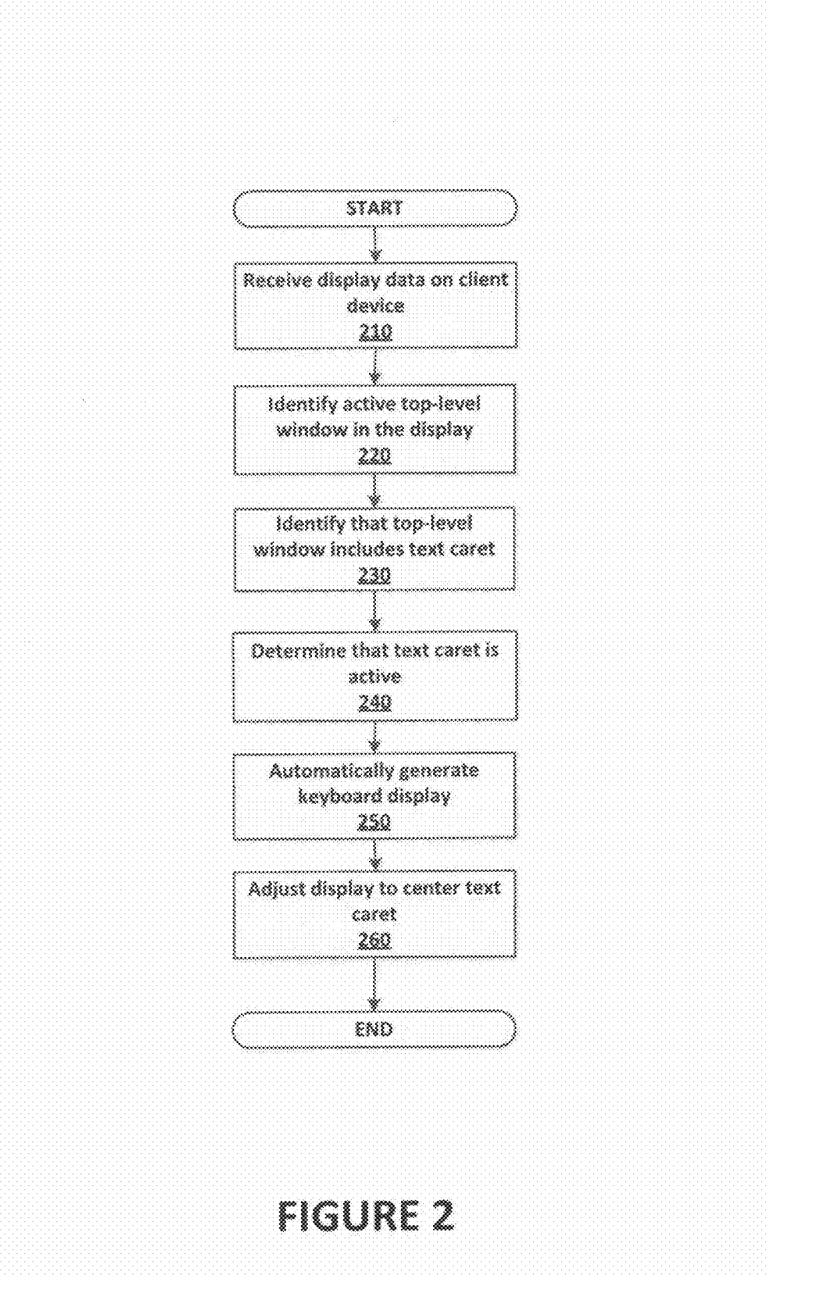
FIG. 2 is a flowchart illustrating an exemplary method of managing text for cross-platform display.

FIG. 2 illustrates a method 200 for automatic adjustment for cross-platform display. The method 200 of FIG. 2 may be embodied as executable instructions in a non-transitory computer readable storage medium including but not limited to a CD, DVD, or non-volatile memory such as a hard drive. The instructions of the storage medium may be executed by a processor (or processors) to cause various hardware components of a computing device hosting or otherwise accessing the storage medium to effectuate the method. The steps identified in FIG. 2 (and the order thereof) are exemplary and may include various alternatives, equivalents, or derivations thereof including but not limited to the order of execution of the same.

In method 200 of FIG. 2, a request initiated at a client device may be sent over a communication to a host device. Data responsive to the request may be received. Such data may include information regarding a display of the host device. One or more top-level windows in the host device display are identified. Further, it is determined which of the top-level windows is currently active. The bounds for the active top-level window are determined, and instructions for automatic adjustment of the display of the client device are generated based on the bounds of the active top-level window.

In step 210, data responsive to the request is received regarding a display of a host device. For example, where a mobile client device (e.g., client device 120A) requests access to a document hosted on a host device (e.g., client device 120C), the display may include a window presenting at least a portion of the requested document. Similarly, where the mobile device 120A requests that host device 120C perform a task (e.g., launch an application), the display may include a window presenting a user interface associated with the application.

In step 220, an active top-level window of host device 120C is identified. One or more top-level windows may be associated with the host device 120C. A top-level window is generally a window that is not part of another window. In contrast, a child window is confined to another window. Where child windows are typically used to divide the parent window into discrete areas, top-level windows may be independent of any other windows. A pop-up window (e.g. dialogue box, message box) is a specific type of top-level window. Depending on the application(s) currently running on host device 120C, there may be any number of top-level windows that may be present.

Figure 3A:
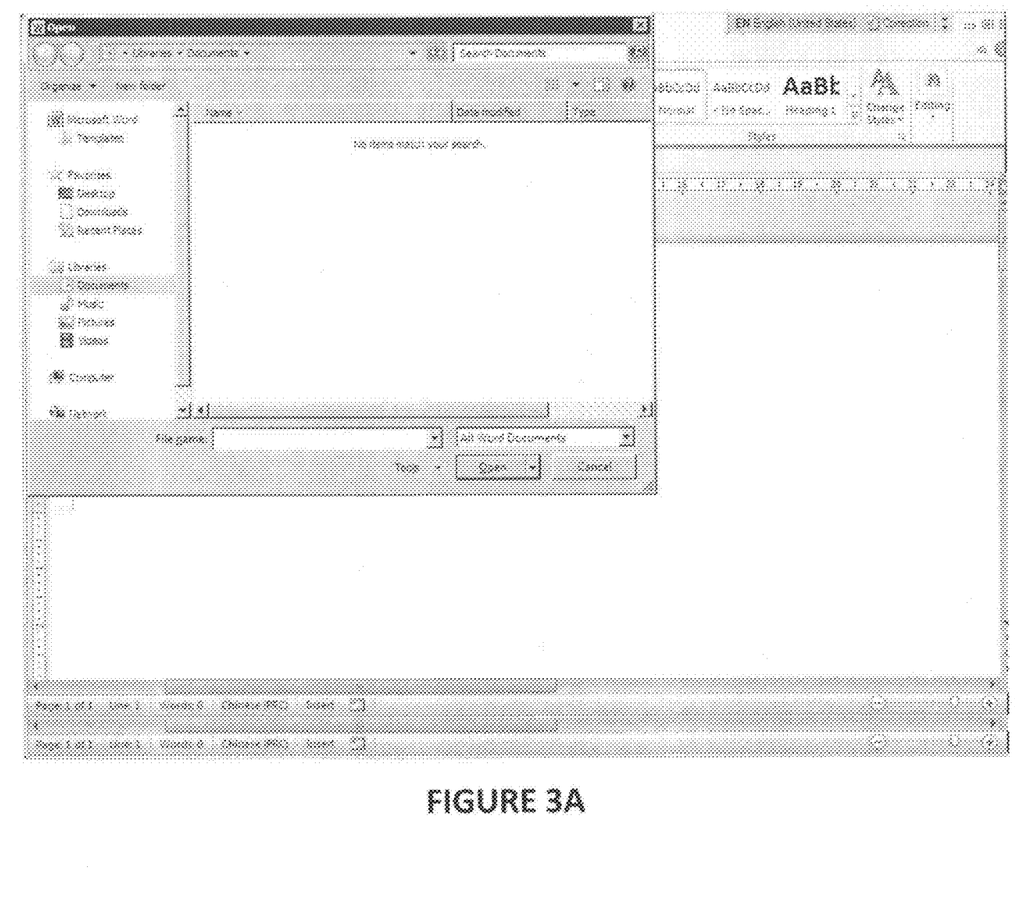
FIG. 3A is a screenshot of an exemplary top-level window.

An active top-level window is typically associated with an application that is currently being used or most recently used. As an example, in a Microsoft Windows® environment running multiple applications, multiple top-level windows may be present. There is usually only one top-level window, however, that is active at a time. The top-level window may be displayed in fullscreen or as being on top of a layered stack of the other top-level windows. The identification of whether, how many, and activity of the top-level window(s) currently associated with host device 120C may be based on the responsive data received in step 210. FIG. 3A is a screenshot of an exemplary top-level window.

In step 230, a text caret is identified in the active top-level window. A typical text caret may appear in any window (e.g., text box) that accepts text input. In some instances, a text caret may be associated with a cursor or other indicator that text may be input into the window. As such, the existence of a text caret may be identified based on the presence of the indicator or other data included in the responsive data received in step 210.

Alternatively, a text caret may be indicated based on a child window of the current foreground window being in focus. A host operating system (e.g., the one running the legacy application) may include a focus management mechanism. Within a foreground top-level window, an operating system such as Windows® can manage a currently active "focus" child window. The focus window is a specific child window (e.g., an individual control within the larger window), such as an edit box, that is currently designated for receiving keyboard input. When no child window is in focus, keyboard events may not be able to be delivered to any particular child window within the foreground top-level window. Some operating systems and user interface frameworks may therefore keep track of a single focus window within each foreground window. A combination of the foreground window (e.g., currently active top-level window) coupled with the focus window within that top-level window may be used to determine where to route keyboard input events.

In step 240, it is determined that the text caret is active. Some windows (e.g., text boxes) automatically activate an associated text caret upon opening. Alternatively, some windows may activate a text caret when requested, selected, or otherwise indicated. For example, a window may include a box or field that, when selected by the user, activates a text caret within. The window illustrated in FIG. 3A, for example, includes an active text caret.

In step 250, a keyboard display may be generated based on the activated text caret. For some client devices 120A, the user may input text using a keyboard display on a touchscreen. As such, the keyboard may be part of the display. Because various uses of client device 120A may not require the ability to enter text, the keyboard display may be hidden until requested or otherwise activated.

In step 260, the display is adjusted based on the location of the activated text caret. Typically, a window may appear in any size and proportion to a display screen. For example, a window may expand to fit the entire display screen of a device. Alternatively, a window may only use a portion of the display screen; or the window may be bigger than the display screen, requiring a user to scroll (e.g., up-down, right-left) to see the entire window. The generation of a keyboard display in step 250 further constrains the screen space that may be used to display other items such as the active top-level window and active text caret.

Some devices allow a user to manually resize a window, change orientation of the screen, request automatic resizing to fit a fullscreen, or set defaults regarding size and fullscreen display. Because the display screens associated with client device 120A and client device 120C may be very different, the optimum size for viewing by a user may be different from one client device 120 to another. For example, a window that may use only a portion of the display screen for client device 120C may be sufficient for a user. On a client device 120A that has a much smaller display screen than client device 120C, the user may wish for the window to use as much of the display screen as possible.

Figure 3B:
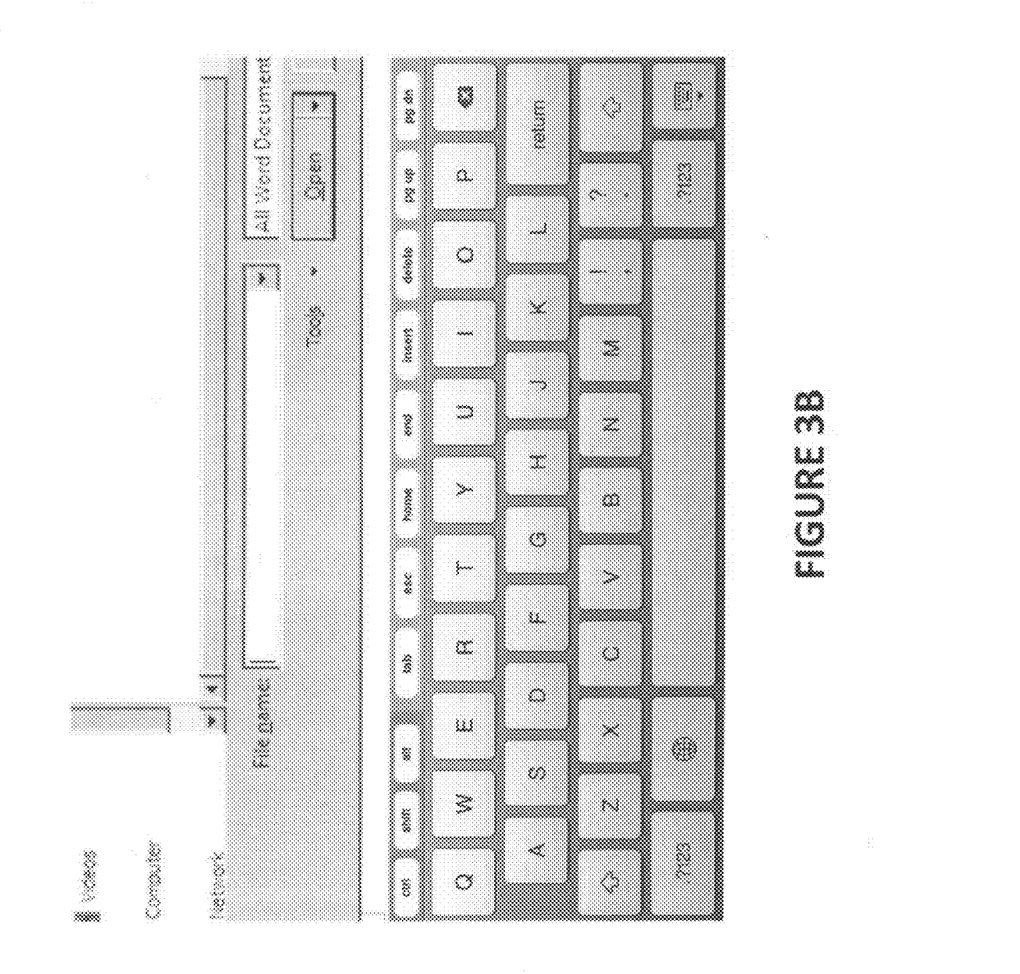
FIG. 3B is a screenshot of a screen that has been adjusted in accordance with an exemplary method of managing text for cross-platform display.

Based on such factors, the display of the client device 120A may automatically adjusted to optimize the display of the active top-level window and text caret. Where a display screen of a requesting client device 120A is much smaller than that of the host client device 120C, for example, the automatic adjustment may include moving or re-centering a text box above a keyboard display. Adjustment may further include enlarging or zooming in on the top-level window and text such that it constitutes a larger proportion of the mobile device 120A display screen. FIG. 3B is a screenshot of a screen that has been adjusted in accordance with an exemplary method of managing text for cross-platform display. Other adjustments are also possible, including adjusting text size and other display adjustments known in the art.

Various embodiments of the present invention allow for the method 200 to be performed by an intermediary device (e.g., server 130) which may be associated with the host device or reside elsewhere in the network (e.g., in the cloud). For example, server 130 may receive a request from a requesting client device 120A, forward to a host client device 120C, receive responsive data from host client device 120C, use the responsive data to identify the top-level window(s), identify which top-level window/text caret is active, identify any active text carets, and generate the instructions for automatic adjustment, which may then be sent to client device 120A.

Alternatively, the method 200 may be performed by software downloaded to a client device 120. For example, software located at either requesting client device 120A or host client device 120C may provide a request initiated at the requesting client device 120A to host client device 120C, receive data responsive to the request as provided by host client device 120C, use the responsive data to identify the top-level window(s)/text carets, identify which top-level window/text caret is active, and generate the instructions for automatic adjustment, which may then be sent or otherwise provided to client device 120A.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

While various embodiments have been described above, it should be understood that they have been presented by way of example only, and not limitation. The descriptions are not intended to limit the scope of the invention to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the invention as defined by the appended claims and otherwise appreciated by one of ordinary skill in the art. The scope of the invention should, therefore, be determined not with reference to the above description, but instead should be determined with reference to the appended claims along with their full scope of equivalents.

What is claimed is:

1. A method for managing text in cross-platform display, the method comprising:
receiving data sent over a communication network from a host device, the data including information regarding a display of the host device;
executing instructions stored in memory, wherein execution of instructions by a processor:
identifies that a window associated with a display of the host device has been opened, wherein the opening of the window automatically activates a text caret in the opened window, the identification based on the received data,
determines that the text caret has been activated, wherein activation of the text caret initiates display of a keyboard in a portion of a display of a client device, and
generates instructions for automatic adjustment of the opened window in a remaining portion of the display of the client device, the automatic adjustment based on a location of the active text caret in the opened window, wherein the automatic adjustment comprises zooming in on the text caret that was automatically activated by the opening of the window in the display of the host device; and
sending the generated instructions over the communication network to the client device, wherein execution of the instructions by the client device results in the automatic adjustment of the opened window in the client device with respect to the remaining portion of the display of the client device based on the location of the active text caret.

2. The method of claim 1, wherein the determination that the text caret has been activated comprises identifying that the window is an active top-level window.

3. The method of claim 2, wherein the determination that the text caret has been activated further comprises identifying the presence of a cursor or other indicator in the active top-level window.

4. The method of claim 1, wherein the determination that the text caret has been activated comprises identifying that the window is in focus, wherein being in focus designates the window for receiving text.

5. The method of claim 1, wherein the remaining portion of the client device display includes a window corresponding to the window with the active text caret.

6. The method of claim 5, wherein the instructions for automatic adjustment further concern enlargement or zooming of the corresponding window.

7. The method of claim 5, wherein the instructions for automatic adjustment further concern centering of the corresponding window.

8. The method of claim 5, wherein the instructions for automatic adjustment concern further changing size of the text within the corresponding window.

9. A system for managing text in cross-platform display, the system comprising:
a communications interface for receiving data sent over a communication network from a host device, the data including information regarding a display of the host device; and
a processor for executing instructions, wherein execution of the instructions by the processor:
identifies that a window associated with a display of the host device has been opened, wherein the opening of the window automatically activates a text caret in the opened window, the identification based on the received data,
determines that the text caret has been activated, wherein activation of the text caret initiates display of a keyboard in a portion of a display of a client device, and
generates instructions for automatic adjustment of the opened window in a remaining portion of the display of the client device, the automatic adjustment based on a location of the active text caret in the opened window, wherein the automatic adjustment comprises zooming in on the text caret that was automatically activated by the opening of the window in the display of the host device,
wherein the communications interface sends the generated instructions over the communication network to the client device, and wherein execution of the instructions by the client device results in the automatic adjustment of the opened window in the client device with respect to the remaining portion of the display of the client device based on the location of the active text caret.

10. The system of claim 9, wherein the processor determines that the text caret has been activated by identifying that the window is an active top-level window.

11. The system of claim 10, wherein the processor further determines that the text caret has been activated by identifying the presence of a cursor or other indicator in the active top-level window.

12. The system of claim 9, wherein the processor determines that the text caret has been activated by identifying that the window is in focus, wherein being in focus designates the window for receiving text.

13. The system of claim 9, wherein the remaining portion of the client device display includes a window corresponding to the window with the active text caret.

14. The system of claim 13, wherein the instructions for automatic adjustment concern enlargement or zooming of the corresponding window.

15. The system of claim 13, wherein the instructions for automatic adjustment concern centering of the corresponding window.

16. The system of claim 13, wherein the instructions for automatic adjustment concern changing size of the text within the corresponding window.

17. A non-transitory computer-readable storage medium, having embodied thereon a program executable by a processor to perform a method for automatic adjustment of cross-platform display, the method comprising:
receiving data sent over a communication network from a host device, the data including information regarding a display of the host device;
executing instructions stored in memory, wherein execution of instructions by a processor:
identifies that a window associated with a display of the host device has been opened, wherein the opening of the window automatically activates a text caret in the opened window, the identification based on the received data, determines that the text caret has been activated, wherein activation of the text caret initiates display of a keyboard in a portion of a display of a client device, and generates instructions for automatic adjustment of the opened window in a remaining portion of the display of the client device, the automatic adjustment based on a location of the active text caret in the opened window, wherein the automatic adjustment comprises zooming in on the text caret that was automatically activated by the opening of the window in the display of the host device; and sending the generated instructions over the communication network to the client device, wherein execution of the instructions by the client device results in the automatic adjustment of the opened window in the client device with respect to the remaining portion of the display of the client device based on the location of the active text caret.

\* \* \* \* \*